United States Patent
Kimura

(10) Patent No.: US 10,897,544 B2
(45) Date of Patent: Jan. 19, 2021

(54) IMAGE FORMING APPARATUS WITH AN IMPROVED SECURITY SYSTEM FOR PROHIBITING PRINTING AREAS

(71) Applicant: KYOCERA Document Solutions Inc., Osaka (JP)

(72) Inventor: Shinichi Kimura, Osaka (JP)

(73) Assignee: Kyocera Document Solutions, Inc.

( * ) Notice: Subject to any disclaimer, the term of this patent is extended or adjusted under 35 U.S.C. 154(b) by 11 days.

(21) Appl. No.: 16/387,925

(22) Filed: Apr. 18, 2019

(65) Prior Publication Data

US 2019/0327366 A1    Oct. 24, 2019

(30) Foreign Application Priority Data

Apr. 24, 2018 (JP) ................. 2018-083513

(51) Int. Cl.
*H04N 1/00* (2006.01)
*H04N 1/04* (2006.01)
*G06F 3/12* (2006.01)

(52) U.S. Cl.
CPC ....... *H04N 1/00167* (2013.01); *G06F 3/1222* (2013.01); *H04N 1/04* (2013.01)

(58) Field of Classification Search
CPC .... H04N 1/00167; H04N 1/04; G06F 3/1222; G06F 3/1239; G06F 3/1285
See application file for complete search history.

(56) References Cited

U.S. PATENT DOCUMENTS

| 2016/0112600 A1* | 4/2016 | Mashimo | ........... G06K 9/00456 358/3.28 |
| 2018/0270370 A1* | 9/2018 | Hakamada | ........... G06F 3/1298 |

FOREIGN PATENT DOCUMENTS

JP    2005-216237    8/2005

* cited by examiner

*Primary Examiner* — Christopher Wait

(57) ABSTRACT

An image forming apparatus includes an image acquiring unit and a security pattern attaching unit. The image acquiring unit is configured to acquire a target image. The security pattern attaching unit is configured to select a security level of a partial area in the target image among plural security levels, and attach a security pattern corresponding to the selected security level to a position corresponding to the partial area.

4 Claims, 3 Drawing Sheets

IMAGE FORMING APPARATUS WITH AN IMPROVED SECURITY SYSTEM FOR PROHIBITING PRINTING AREAS

CROSS-REFERENCE TO RELATED APPLICATIONS

This application relates to and claims priority rights from Japanese Patent Application No. 2018-083513, filed on Apr. 24, 2018, the entire disclosures of which are hereby incorporated by reference herein.

BACKGROUND

1. Field of the Present Disclosure

The present disclosure relates to an image forming apparatus.

2. Description of the Related Art

In a system, a print control device specifies as a print prohibited area a partial area in a print target image, and a printing device performs printing after a mask process to disable to recognize confidential information in the print prohibited area on a printed matter.

However, in the aforementioned system, the same mask processes are performed for all print prohibited areas, and therefore, a visibility level is hardly regulated individually for each partial area in an image. For example, different mask processes are required (a) to disable to recognize which of a text (i.e. one or more character) or an image (i.e. photograph or the like) a partial area contains, and (b) when a partial area contains a text, to allow to recognize that the partial area contains a text but disable to understand a text. However, the aforementioned system hardly performs such different mask processes corresponding to such desired visibility levels.

SUMMARY

An image forming apparatus according to an aspect of the present disclosure includes an image acquiring unit and a security pattern attaching unit. The image acquiring unit is configured to acquire a target image. The security pattern attaching unit is configured to select a security level of a partial area in the target image among plural security levels, and attach a security pattern corresponding to the selected security level to a position corresponding to the partial area.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
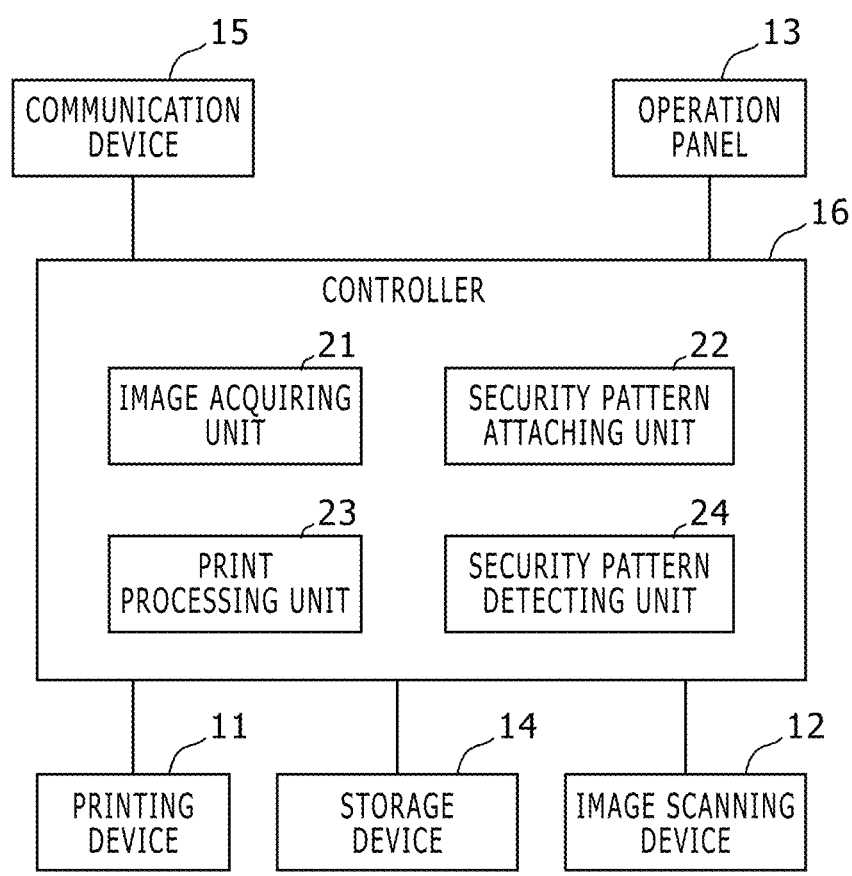
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus shown in FIG. 1 has an electrophotographic printer function and a scanner function, and includes a printing device 11, an image scanning device 12, an operation panel 13, a storage device 14, a communication device 15, and a controller 16.

The printing device 11 is an internal device that prints an image based on print image data on a paper sheet page by page in an electrophotographic manner.

Further, the image scanning device 12 is an internal device that optically scans an image of a document such as printed matter page by page and generates image data of each scanned page image.

Furthermore, the operation panel 13 is arranged on a surface of a housing of the image forming apparatus, and includes a display device that displays sorts of information to a user and an input device that detects a user operation. For example, a liquid crystal display is used as the display device, and a hard key, and a touch panel for soft key are used as the input device.

Furthermore, the storage device 14 is a device capable of storing sorts of data and programs.

Furthermore, the communication device 15 is a circuit that connects to a computer network (not shown) and performs data communication with another device (e.g. a host device) connected to the network.

The controller 16 includes a CPU (Central Processing Unit), a ROM (Read Only Memory), a RAM (Random Access Memory) and the like, loads a program from the ROM, the storage device 14 or the like to the RAM, and executes the program with the CPU and thereby acts as various processing units.

In this embodiment, the controller 16 acts as an image acquiring unit 21, a security pattern attaching unit 22, a print processing unit 23, and a security pattern detecting unit 24.

The image acquiring unit 21 acquires a target image. In a copy job, the image acquiring unit 21 acquires as the target image from the image scanning device 12 a document image scanned by the image scanning device 12. In a print job, the image acquiring unit 21 acquires as the target image from the communication device 15 a document image received by the communication device 15.

The security pattern attaching unit 22 selects a security level of a partial area in the acquired target image among plural security levels, and attaches a security pattern corresponding to the selected security level to a position corresponding to the partial area.

For example, this position corresponding to the partial area is a predetermined position in the partial area, a predetermined position in a periphery area of the partial area or the like. This position may be set by a user.

Further, the security pattern is a predetermined character string or a visible or invisible pattern image of a specific pattern. This character string and/or this specific pattern may be set by a user.

Furthermore, the security pattern attaching unit 22 determines a type of the partial area as either a text area or a photograph area, and selects a security level corresponding to the determined type as the security level of the partial area.

Figure 2:
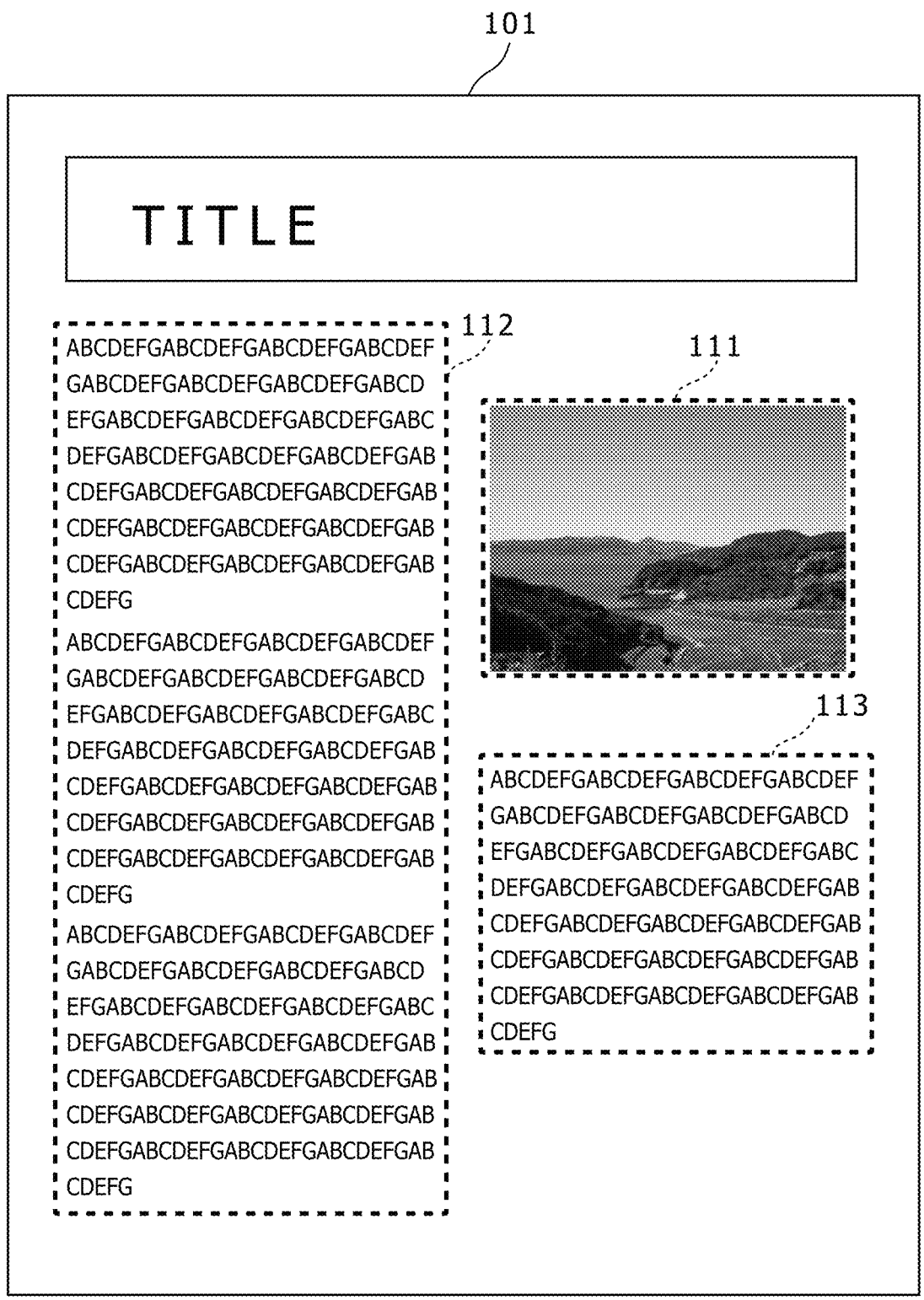
FIG. 2 shows a diagram that indicates an example of a target image.

FIG. 2 shows a diagram that indicates an example of a target image. The target image 101 shown in FIG. 2 includes a photograph area 111 and text areas 112 and 113. The security pattern attaching unit 22 detects as the aforementioned partial areas the photograph area 111 and the text areas 112 and 113 on the basis of a known area separation process, and for the photograph area 111, selects a first security level and for the text areas 112 and 113, selects a second security level higher than the first security level.

In addition, the security pattern attaching unit 22 may (a) attach the security pattern to a position corresponding to the partial area if the partial area is detected in the target image, and (b) attach a security pattern corresponding to the whole target image to a margin part of an outer edge of the target image if the partial area is not detected in the target image.

It should be noted that if the security pattern detecting unit 24 detects a security pattern that has been already included in the target image then the security pattern attaching unit 22 does not attach the aforementioned security pattern.

The print processing unit 23 generates print data based on print image data and provides the print data to the printing device 11, and thereby causes the printing device 11 to perform the printing. The print image data is raster image data. The print data is, for example, data obtained from the print image data by an image process such as half toning.

If the security pattern detecting unit 24 does not detect any security patterns included in the target image, then the print processing unit 23 causes the printing device to perform printing of the target image in which a security pattern is attached.

The security pattern detecting unit 24 (a) tries to detect a security pattern in the target image, and (b) detects a security pattern if the target image includes the security pattern. Specifically, the security pattern detecting unit 24 (a) detects a partial area in the target image on the basis of a known area separation process, (b) determines whether a security pattern is attached at a position corresponding to the partial area or not, and (c) extracts the security pattern if it is determined that the security pattern is attached.

It should be noted that if the security pattern detecting unit 24 detects a security pattern that has been already included in the target image then the print processing unit 23 (a) determines a security level corresponding to the detected security pattern, (b) performs a mask process of a visibility corresponding to the determined security level for a partial area to which the security pattern has been attached, and (c) causes the printing device 11 to perform printing of the target image for which the mask process has been performed.

In this process, the mask process of a visibility corresponding to the determined security level is selected among predetermined plural mask processes that result in plural visibility levels, respectively.

For example, the mask processes that result in plural visibility levels include (a) a first level mask process that masks the whole area of the partial area with a fixed pattern (i.e. fixed density pattern and/or fixed color pattern) and (b) a second level mask process that overlaps a specific character string or a specific pattern image onto the partial image. If the security level is determined as the first level, then the first level mask process is selected; and if the security level is determined as the second level, then the second level mask process is selected.

The second level mask process may be a resolution conversion process that converts an original resolution of the target image to a resolution lower than the original resolution (for example, by multiplying a predetermined ratio).

In addition, in this process, the print processing unit 23 may (a) determine an authorization level of a user, (b) select a mask process of a visibility corresponding to the determined authorization level and the determined security level, (c) perform the selected mask process, and (d) cause the printing device 11 to perform printing of the target image for which the mask process has been performed.

For example, if the authorization level indicates a normal user, then a default mask process (e.g. the aforementioned first or second level mask process) is selected; and if the authorization level indicates an advanced user who has a higher authorization level, then another mask process is selected that results in a visibility better than a visibility of the default mask process. Thus, for example, regarding a partial area to which the first level mask process is set for a normal user, the second level mask process is selected for an advanced user.

Figure 3:
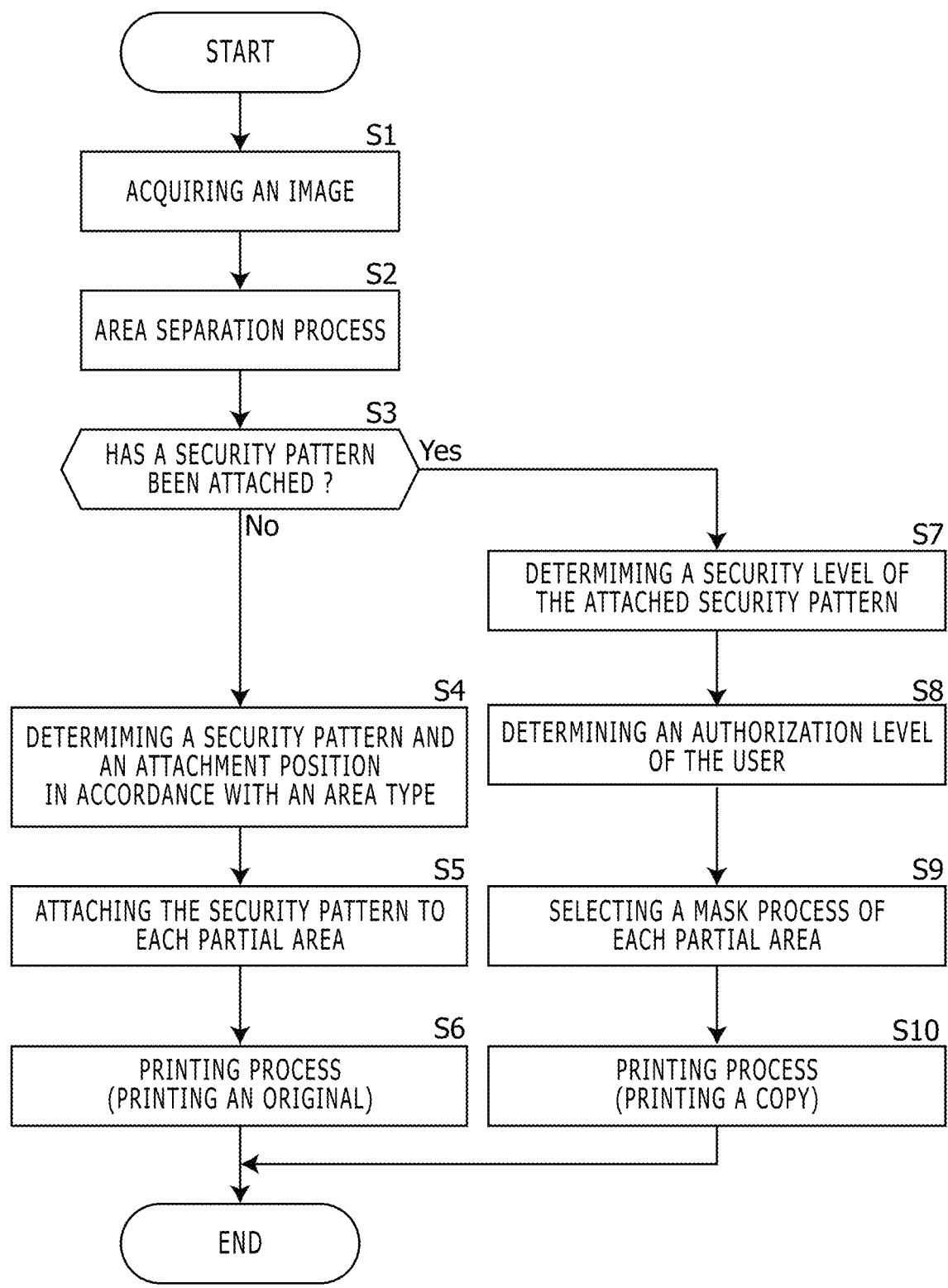
FIG. 3 shows a flowchart that explains a behavior of the image forming apparatus shown in FIG. 1.

The following part explains a behavior of the aforementioned image forming apparatus. FIG. 3 shows a flowchart that explains a behavior of the image forming apparatus shown in FIG. 1.

When receiving a job request, the controller 16 performs the following process and thereby performs the requested job.

Firstly, the image acquiring unit 21 acquires a target image (in Step S1).

After the target image is acquired, the security pattern detecting unit 24 performs an area separation process for the target image, and detects a partial area included in the target image (in Step S2).

Subsequently, the security pattern detecting unit 24 tries to detect a security pattern in the target image, and determines whether the target image includes a security pattern or not (in Step S3). If a partial area is detected in the area separation process, the security pattern detecting unit 24 determines whether a security pattern exists at a position corresponding to the partial area or not. If no partial areas are detected in the area separation process, the security pattern detecting unit 24 determines whether a security pattern exists in the aforementioned margin part or not.

If it is determined that the target image includes no security patterns, then the security pattern attaching unit 22 selects a security level of the partial area selected in the area separation process among plural security levels, determines a security pattern corresponding to the selected security level, determines a position corresponding to each partial area (in Step S4), and attaches the determined security pattern to the determined position (in Step S5).

Subsequently, the print processing unit 23 causes the printing device 11 to perform printing of the target image to which the security pattern was attached in this manner (in Step S6).

Contrarily, if it is determined that the target image includes a security patterns, then the print processing unit 23 determines a security level corresponding to the detected security pattern (in Step S7), determines an authorization level of a user who requests the job on the basis of user registration information (not shown) (in Step S8), selects a mask process of a visibility corresponding to the determined security level and the determined authorization level for the partial area to which this security pattern has been attached (in Step S9), and performs the selected mask process and causes the printing device 11 to perform printing of the target image for which the selected mask process has been performed (in Step S10).

For example, this user registration information is stored in the storage device 14, and is data that includes a user ID, a password, an authorization level and the like that are associated with each other to be used for user authentication in a login process of this image forming apparatus.

As mentioned, in the aforementioned embodiment, the image acquiring unit 21 acquires a target image. The security pattern attaching unit 22 selects a security level of a partial area in the acquired target image among plural security levels, and attaches a security pattern corresponding to the selected security level to a position corresponding to the partial area.

Consequently, image forming (printing or the like) of the target image are performed with respective visibility levels corresponding to partial areas in the target image.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
   an image acquiring unit configured to acquire a target image;
   a security pattern attaching unit configured to select a security level of a partial area in the target image among plural security levels, and attach a security pattern corresponding to the selected security level to a position corresponding to the partial area
   a security pattern detecting unit configured to (a) try to detect the security pattern in the target image, and (b) detect the security pattern if the target image includes the security pattern; and
   a print processing unit configured to (a) determine a security level corresponding to the detected security pattern, (b) perform a mask process of a visibility corresponding to the determined security level for the partial area to which the security pattern has been attached, and (c) cause the printing device to perform printing of the target image for which the mask process has been performed.

2. The image forming apparatus according to claim 1, wherein the security pattern attaching unit determines a type of the partial area as either a text area or a photograph area, and selects a security level corresponding to the determined type as the security level of the partial area.

3. The image forming apparatus according to claim 1, wherein the security pattern attaching unit (a) attaches the security pattern to a position corresponding to the partial area if the partial area is detected in the target image, and (b) attaches a security pattern corresponding to the whole target image to a margin part of an outer edge of the target image if the partial area is not detected in the target image.

4. The image forming apparatus according to claim 1, wherein the print processing unit (a) determines an authorization level of a user, (b) selects a mask process of a visibility corresponding to the determined authorization level and the determined security level, (c) performs the selected mask process, and (d) causes the printing device to perform printing of the target image for which the mask process has been performed.

* * * * *